United States Patent [19]

Habiger

[11] 4,213,484
[45] Jul. 22, 1980

[54] SINGLE HANDLE CONTROL APPARATUS
[75] Inventor: Cyril W. Habiger, Joliet, Ill.
[73] Assignee: Caterpillar Tractor Co., Peoria, Ill.
[21] Appl. No.: 910,250
[22] Filed: May 30, 1978
[51] Int. Cl.$^2$ ............................................. F16K 11/18
[52] U.S. Cl. ............................. 137/636.1; 74/471 XY; 137/636.2; 251/251
[58] Field of Search .................. 137/636, 636.1, 636.2; 74/471 XY, 471 R; 91/522

[56] References Cited
U.S. PATENT DOCUMENTS

| | | | |
|---|---|---|---|
| 978,579 | 12/1910 | Grebel et al. | 137/636.1 |
| 2,040,663 | 5/1936 | Mallet et al. | 137/636.1 |
| 2,205,684 | 6/1940 | Cochran | 137/636.2 |
| 3,401,522 | 9/1968 | Hann et al. | 74/473 R X |
| 4,036,321 | 7/1977 | Habiger | 74/471 XY X |

Primary Examiner—Martin P. Schwadron
Assistant Examiner—Richard Gerard
Attorney, Agent, or Firm—William B. Heming

[57] ABSTRACT

A control apparatus has a single control handle, first and second work elements, and first and second ramps each contacting a respective work element. Apparatus is further provided for selectively, progressively pivoting only one of the ramps in response to controllably moving the single control handle. One of the ramps pivotally moves in response to moving the handle in a first plane to a first position and in a different second plane from a first toward a second position. The other ramp pivotally moves in response to moving the handle in the first plane to a second position and in a different third plane from a first toward a second position. Respective work elements are thereby moved between a plurality of positions for controlling an operation such as the flow of fluid through associated, respective valves.

15 Claims, 5 Drawing Figures

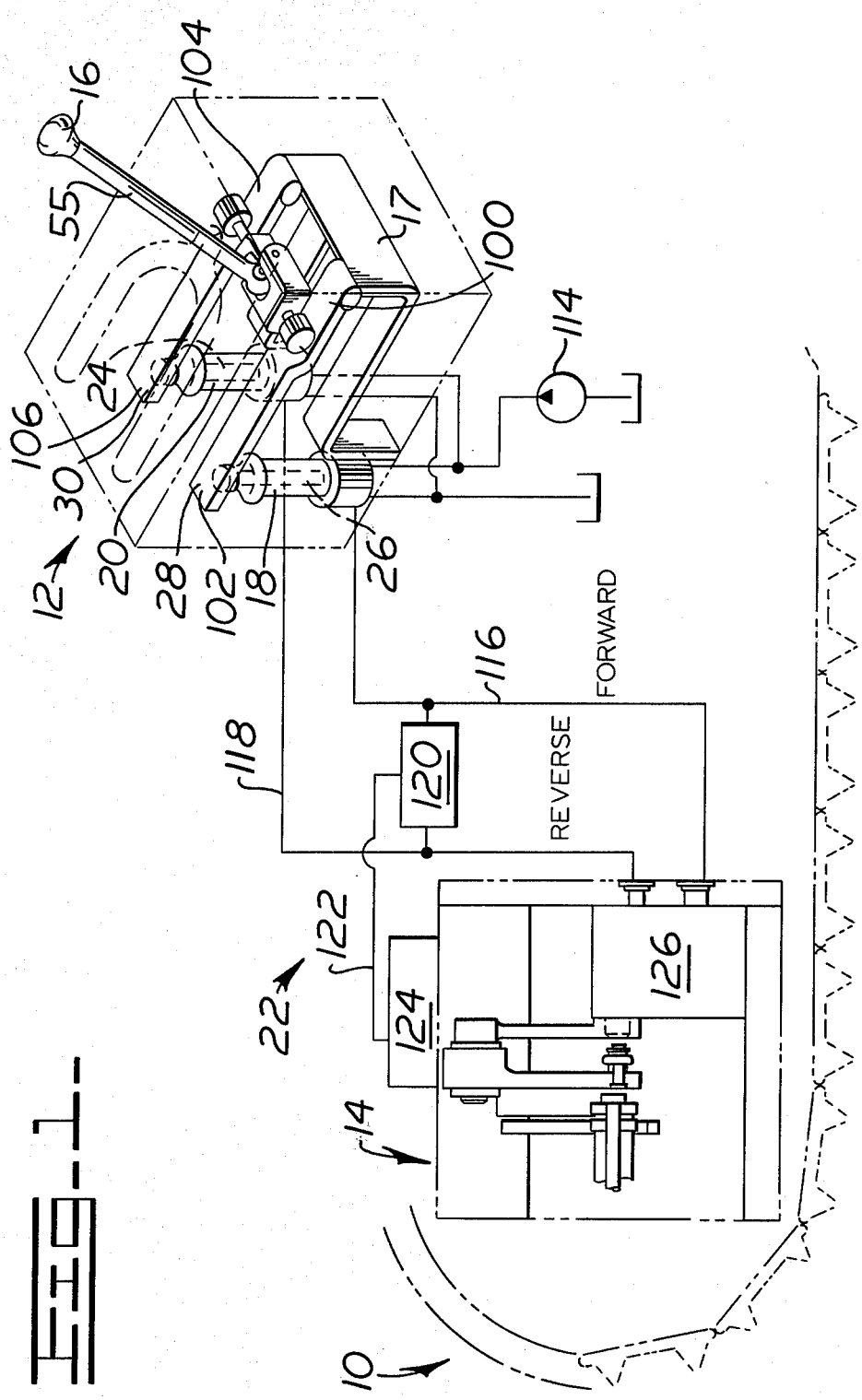

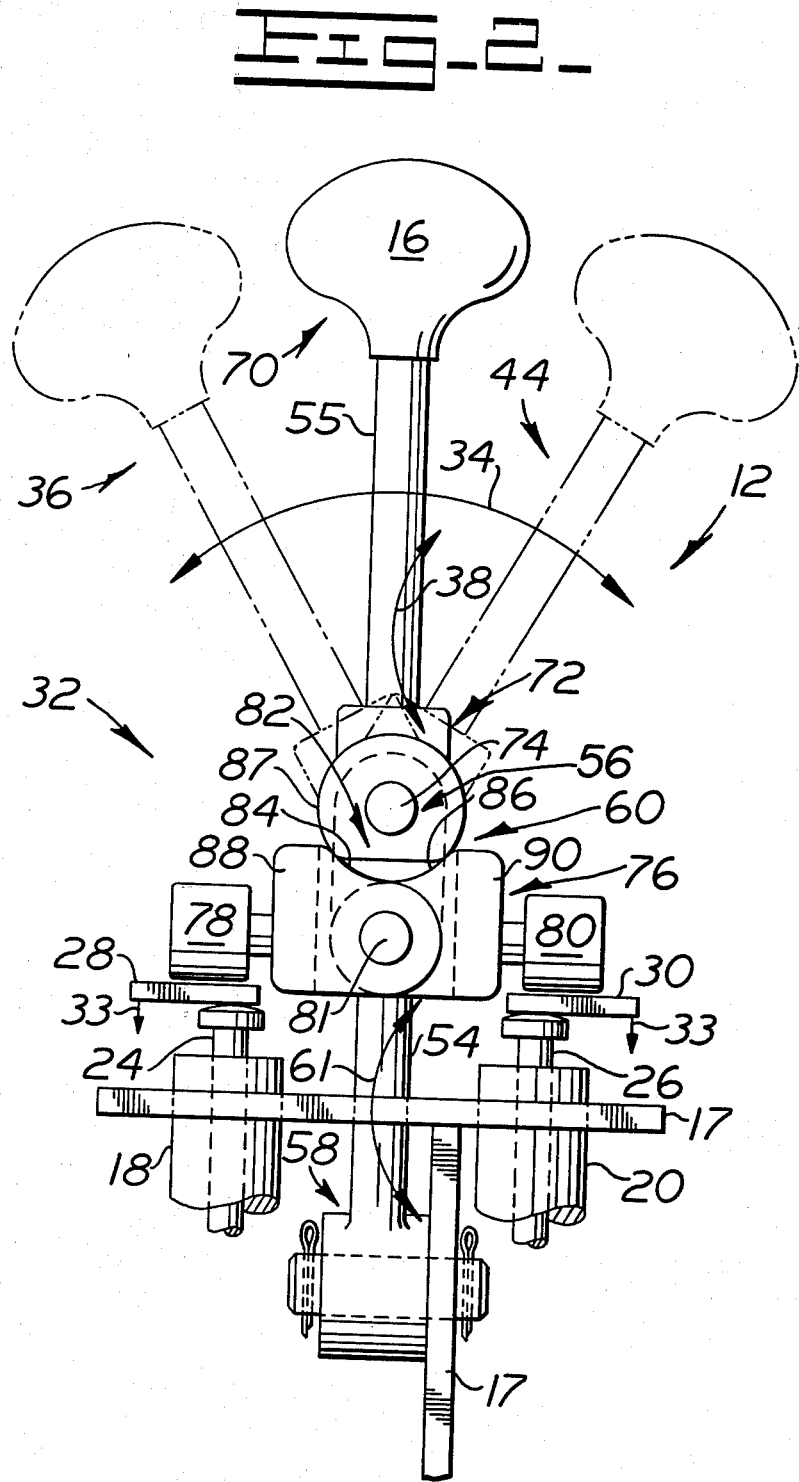

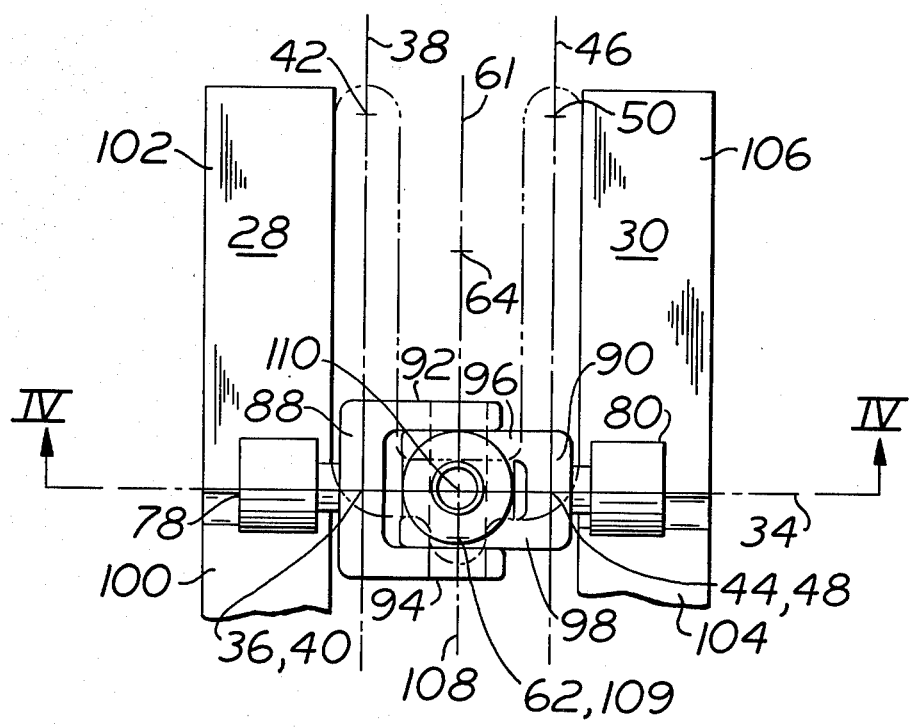
Fig-3-
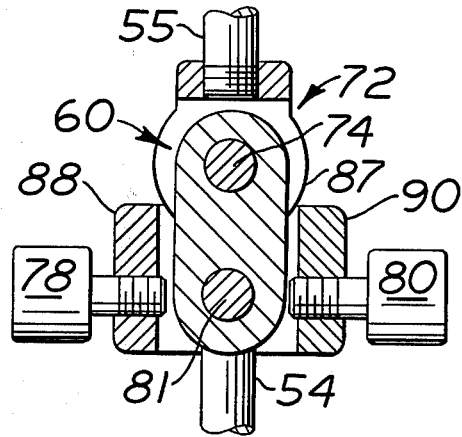
Fig-4-

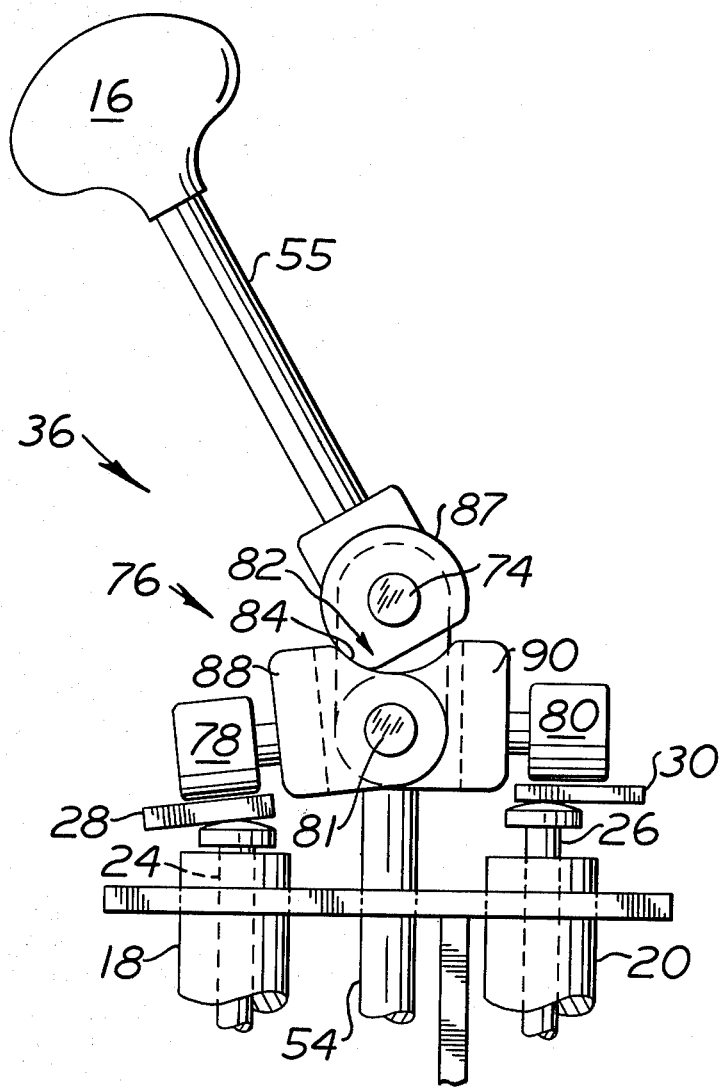

SINGLE HANDLE CONTROL APPARATUS

BACKGROUND

A single handle control apparatus can be used on a work vehicle, material conveying system, or in other applications where it is desirable to move a single handle to select and control operations. For example, such a control apparatus is commonly used on a track-type tractor to select and control forward or reverse travel of the vehicle. In a hydrostatically controlled tractor, it is preferable to avoid mechanical linkage and to hydraulically connect the control apparatus directly to a hydrostatic transmission of the tractor.

The present invention is directed to overcoming the problems associated with providing a single handle control apparatus for directly moving separate hydraulic valve spools in respective valves in order to operate the hydrostatic transmission and perform separate work operations associated with a respective valve. Therefore, it is desirable to provide means for selectively and progressively moving each of the valve spools of a respective valve in response to moving a single control handle.

SUMMARY

According to the present invention, a control apparatus has a control handle, first and second work elements, and first and second ramps each contacting a respective work element. Means is provided for selectively, progressively pivoting only one of the ramps in a preselected direction in response to moving the control handle. One of the ramps pivotally moves in response to moving the control handle in a first plane to a first position and in a different second plane from a first position toward a second position. The other ramp moves in response to moving the handle in the first plane to a second position and in a different third plane from a first position toward a second position. Each of the work elements moves between a plurality of positions in response to pivotally moving an associated ramp for controlling an operation associated with the respective work element.

BRIEF DESCRIPTION OF DRAWINGS

FIG. 1 is a diagrammatic view of one embodiment of the invention on a work vehicle.

FIG. 2 is a diagrammatic view showing one embodiment of the invention in greater detail.

FIG. 3 is a diagrammatic view showing one embodiment of the invention in greater detail.

FIG. 4 is a diagrammatic cross-sectional view of the apparatus of FIG. 3.

FIG. 5 is a diagrammatic view showing one embodiment of the invention in greater detail.

DETAILED DESCRIPTION

Referring to the drawings, a track-type tractor 10, for example, has a single handle control apparatus 12 and transmission 14. Said apparatus 12 has a single control handle 16, frame 17 and associated first and second work elements 24,26. As is shown, each of the work elements 24,26 is a valve spool 24,26. The control apparatus 12 has first and second valves 18,20 fixed relative to the frame 17. A hydraulic circuit 22 connects the transmission 14 to the valves 18,20.

First and second valve spools 24,26 are movably positioned in respective valves 18,20. First and second ramps 28,30 contact respective valve spools 24,26. Each of said ramps 28,30 is pivotally, independently movalbe relative to the frame 17. As shown, the ramps 28,30 are connected to the frame 17.

Referring to FIG. 2, first means 32 is provided for selectively, progressively pivoting only one of the ramps 28,30 in a preselected direction 33. The first ramp 28 pivotally moves in response to moving the control handle 16 in a first plane 34 to a first position 36 and in a different second plane 38 from a first position 40 toward a second position 42. The second ramp 30 is pivotally moved in response to moving the control handle 16 in the first plane 34 to a second position 44 and in a different third plane 46 from a first position 48 toward a second position 50. It should be understood that said ramps 28,30 can also be reversed without departing from this invention.

As is shown in FIGS. 2 and 3, the first means 32 includes a lever arm 54, control arm 55 and second means 56. The lever arm 54 has first and second end portions 58,60 and is pivotally connected at the first end portion 58 to the frame 17. Said lever arm 54 is moveable along the second and third planes 38,46 between respective first and second positions 62,64 in response to moving the control handle 16 in said second and third planes 38,46 between respective first and second positions 40,42,48,50. In other words, in the embodiment shown, moving the control handle 16 in the second or third planes 38,46 correspondingly moves the lever arm 54 in only one pathway 61 of movement defined by said first and second positions 62,64. Thus, said single pathway 61 defines movement of the lever arm 54 along both the second and third planes 38,46.

The control arm 55 has first and second end portions 70,72. Said control arm 55 is connected at the first end portion 70 to the control handle 16 and at the second end portion 72 to the lever arm second end portion 60. The control arm 55 pivotally moves along the first plane 34 between said first and second control handle positions 36,44. Said control arm 55 also moves along said second and third planes 38,46 between respective first and second positions 40,42,48,50 of the control handle 16.

The second means 56 connects the control arm second end portion 72 to the lever arm second end portion 60. The control arm 55 is pivotally moveable along the first plane 34 relative to the lever arm 54. Further, the lever arm 54 and control arm 55 moves unitarily along the second and third planes 38,46. Preferably, said means 56 is a first pin 74 pivotally connecting said second end portions 60,72 and extending along the second plane 38.

As is shown, the first means 32 is a roller system 76. A second pin 81 pivotally connects the roller system 76 to the lever arm second end portion 60 and extends along the second plane 38. Said roller system 76 has first and second opposed contacting elements 78,80 and a cam surface 82. The cam surface 82 has first and second portions 84,86. The second end portion 72 of the control arm 55 has a cam 87 in contact with said cam surface 82.

The first and second opposed contacting elements 78,80 are each positionable adjacent and in contactable relationship with a respective ramp 28,30. As shown, said contacting elements 78,80 are rollers 78,80. Preferably, said rollers 78,80 contact a respective ramp 28,30 prior to moving the control handle 16 to one of the first and second positions 36,44 in the first plane 34. The rollers 78,80 can also be adjacent and positionable in contact with respective ramps 28,30 in response to moving the control handle 16 to one of said positions 36,44 in the first plane 34.

The roller system 76 has first and second members 88,90. A respective roller 78,80 extends outwardly from each member 88,90 and a respective cam surface portion 84,86 is positioned on each member 88,90. Said second pin 81 pivotally connects said members 88,90 to the second end portion 60 of the lever arm 54. Further, as is shown in FIG. 3, said members 88,90 are of "U" configuration and have respective first and second opposed leg portions 92,94,96,98. A portion of said second member 90 is positioned between the opposed leg portions 92,94 of the other member 88. It should be understood that said members 88,90 can also be reversed without departing from this invention.

Each of said ramps 28,30 have respective first and second ramp portions 100,102,104,106 (FIG. 1). Said first portions 100,104 are at different elevations than respective second ramp portions 102,106. The ramps 28,30, contacting elements 78,80, cam 87 and cam surface 82 can also be of other configurations without departing from the invention.

It is desirable that the first means 32 progressively, pivotally move the ramps 28,30 as a unit in the preselected direction 33 in response to moving the control handle 16 in a different, fourth plane 108. The handle 16 is moveable in said fourth plane 108 from a first position 109 at which said first means 32 is blocked from pivotally moving the ramps 28,30 toward a second position 110 on the first plane 34.

Preferably, the first plane 34 is substantially normal to the second and fourth planes 38,108 and the second plane 38 is substantially parallel to the third plane 46.

As is shown in the drawings, it is desirable that the pathway 61 of movement of the control arm 55 along the fourth plane 108 extend in a direction common to the pathway of movement of said control arm 55 along the second and third planes 38,46. Said pathway 61 of movement along the fourth plane 108 preferably extends from the first plane 34 in a direction away from the pathway of movement of the control arm 55 along the second and third planes 38,46.

OPERATION

In the operation of the single handle control apparatus 12, the control handle 16 is controllably moved in the first plane 34 to select only one of first and second controllable operations. The handle 16 is then moved in a respective different plane 38,46 to move a respective valve spool 24,26 for controlling that operation.

In the example shown, the control apparatus 12 is used to control the forward and reverse travel operations of the track type tractor 10. Movement of the control handle 16 results in related movement of one or both of the ramps 28,30. Each of the ramps 28,30 moves an associated valve spool 24,26. The valves 18,20 are connected to a high pressure fluid source 114 and movement of respective valve spools 24,26 determines the resultant flow through each of the valves 18,20. The flow passes from a respective valve 18,20 and through associated actuating lines 116,118.

During periods of inactivity of the tractor 10, the handle 16 should be positioned in the fourth plane 108 at the first or vent position 109. At this position, the control apparatus 12 is blocked from moving the valve spools 24,26 and fluid is prevented from passing through the valves 18,20. At this position, operation of the transmission 14 is prevented.

The vehicle operator moves the handle 16 in the fourth plane 108 from said first position 109 toward the second position 110 in order to reset the transmission 14. In so moving the handle 16, the lever arm 54 and control arm 55 unitarily, pivotally move along said fourth plane 108 and the cam 87 forcibly contacts both of the cam surface first and second portions 84,86 (FIG. 2). The first and second members 88,90 and respective rollers 78,80 are thereby moved relative to the ramps 28,30. In the embodiment shown, the rollers 78,80 are subsequently urged in forcible contact with the higher elevational second portions 102,106 of the respective ramps 28,30 at said second position 110 owing to the configuration of the ramps 28,30. Thus, the ramps 28,30 pivotally move in response to moving the control handle 16 in the fourth plane 108 to the second position 110.

This results in movement of the valve spools 24,26 and a preselected fluid flow through the valves 18,20. The fluid passes through the forward and reverse mode lines 116,118, the valve 120 connected therebetween, the pilot line 122 and to the vent valve 124. The pilot pressure to the vent valve 124 resets the transmission 14 for operation. Said pilot pressure is not sufficient to operate the hydraulic actuator 126. Therefore, the forward or reverse modes of the transmission are not initiated.

The elevational differences of the respective ramp first and second portions 100,102,104,106 also provide a distinct stage in moving the control handle 16 to prevent unintentional movement between said fourth plane first and second positions 109,110.

Movement of the handle 16 in the fourth plane 108 to the second position 110, also on the first plane 34, makes further movement of the handle 16 possible in order to select the forward or reverse mode. For example, the operator moves the handle 16 in said first plane 34 to the first position 36 to select forward travel.

In this manner, referring to FIG. 5, the control arm 55 is pivotally moved. The cam 87 is oriented in forcible contact with only the first portion cam surface 84 on the first member 88 owing to the configurations of said cam 87 and cam surface 82. Therefore, only the respective first roller 78 is urged in forcible contact against the first ramp 28. Said ramp 28 moves the respective valve spool 24. Therefore, fluid continues to pass through one of the valves 20 to maintain the signal to the vent valve 124. However, said fluid flow remains insufficient to operate the hydraulic actuator 126.

The first position 36 of the first plane 34 is substantially the same as the first position 40 of the second plane 38. Movement of the handle 16 in the second plane 38 toward the second position 42 is now possible to control the speed rate of travel in the forward mode. The lever and control arms 54,55 move unitarily along the second plane 38 to maintain forcible contact between the first member 88 and the first ramp 28. Therefore, only the first valve spool 24 is moved and fluid passes through only the forward mode line 118. Pressure thereby is sufficient to signal the hydraulic actuator 126 and the transmission 14 responds to provide forward movement of the vehicle 10.

Movement of the handle 16 toward said second position 42 progressively pivotally moves the first ramp 28. The result is further displacement of the valve spool 24 in the preselected direction. Thus, more fluid passes to the actuator 126 to increase the forward speed of the tractor 10. The second member 90 and roller 80 associated with the second ramp 30 correspondingly move with the first member 88. However, said roller 80 is not inforcible contact with the second ramp 30 and is blocked from pivoting said ramp 30.

The reverse mode can be similarly selected and controlled. Further, movement between the modes can be performed without engaging the first or vent position 109 of the fourth plane 108.

As will be evident to those skilled in the art, the ramps 28,30 and elements of the roller system 76 can be of different configurations to define the progressive movement of the valve spools 24,26.

Other aspects, objects and advantages of this invention can be obtained from a study of the drawings, the disclosure and the appended claims.

The embodiments of the invention in which an exclusive property or privilege is claimed are defined as follows:

1. In a control apparatus having a frame, a control handle, first and second work elements, first and second ramps each being independently, pivotally movable relative to the frame and being in contact with a respective work element, each of said work elements being movable between a plurality of positions in response to pivotally moving said respective ramps between a plurality of positions, the improvement comprising:
   first means for selectively, progressively pivoting only one of the first and second ramps in a preselected direction in response to moving the control handle in a first plane to a first position located in said first plane and in a different second plane from a first toward a second position located in said second plane and for selectively, progressively pivoting only the other of said first and second ramps in said preselected direction in response to moving the control handle in the first plane to a second position located in said first plane and in a different third plane from a first toward a second position located in said third plane.

2. The improvement, as set forth in claim 1, including first and second valves fixed relative to the frame and wherein each of the first and second work elements is a valve spool movably positioned in a respective valve.

3. The improvement, as set forth in claim 1, wherein the first means includes:
   a lever arm having first and second end portions and being pivotally connected at the first end portion to the frame, said lever arm being movable along said second and third planes between respective first and second positions in response to the control handle being movable in said second and third planes between the respective first and second positions of said control handle;
   a control arm having first and second end portions and being connected at the first end portion to the control handle and at the second end portion to the second end portion of the lever arm, said control arm being pivotally movable along said first plane between said first and second positions and along said second and third planes between said respective first and second positions; and
   second means for connecting the second end portion of the control arm to the second end portion of the lever arm, said control arm being pivotally movable relative to the lever arm along said first plane and said lever and control arms being unitarily movable along the second and third planes.

4. The improvement, as set forth in claim 3, wherein said second means includes:
   a first pin pivotally connecting the second end portions of the lever arm and the control arm, said pin extending along said second plane.

5. The improvement, as set forth in claim 3, wherein the first means includes:
   a roller system having a cam surface and first and second opposed contacting elements each positionable adjacent and in contactable relationship with a respective ramp;
   a second pin pivotally connecting the roller system to the second end portion of the lever arm, said pin extending along said second plane; and
   said control arm second end portion having a cam for contact with the cam surface of the roller system.

6. The improvement, as set forth in claim 5, wherein the roller system cam surface has first and second portions and said cam is in forcible contact with only the first cam surface portion in the first position of the control handle in the first plane and in forcible contact with only the second cam surface portion in the second position of the control handle in the first plane.

7. The improvement, as set forth in claim 6, wherein the roller system has first and second members, said first and second cam surface portions are positioned on said first and second members, respectively, and said second pin pivotally connects the first and second members to the second end portion of the lever arm.

8. The improvement, as set forth in claim 7, wherein said first and second opposed contacting elements include respective first and second rollers extending outwardly from said respective members.

9. The improvement, as set forth in claim 7, wherein each of said members is of "U" configuration, said U members having respective first and second opposed leg portions and wherein a portion of one of said U members is positioned between the opposed leg portions of the other U member.

10. The improvement, as set forth in claim 1, wherein said first plane is substantially normal to the second plane.

11. The improvement, as set forth in claim 1, wherein said second plane is substantially parallel to said third plane.

12. The improvement, as set forth in claim 1, wherein said first means progressively, pivotally moves said ramps as a unit in response to moving the control handle in a fourth plane from a first position at which said first means is blocked from pivotally moving the ramps toward a second position on the first plane.

13. The improvement, as set forth in claim 12, wherein said fourth plane is substantially normal to the first plane.

14. The improvement, as set forth in claim 12, wherein said first means includes first and second portions of each ramp, each of said first ramp portions being at a different elevation than a respective second ramp portion.

15. The improvement, as set forth in claim 12, wherein the pathway of movement of the control arm along the fourth plane extends in a direction common to the pathway of movement of said control arm along the second and third planes and extends from the first plane in a direction away from the pathways of movement of the control arm along said second and third planes.

* * * * *